United States Patent
Sasaki

(12) 
(10) Patent No.: US 11,588,428 B2
(45) Date of Patent: Feb. 21, 2023

(54) MOTOR CONTROL DEVICE

(71) Applicant: Alps Alpine Co., LTD, Tokyo (JP)

(72) Inventor: Yuzo Sasaki, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/559,405

(22) Filed: Dec. 22, 2021

(65) Prior Publication Data
US 2022/0209700 A1 Jun. 30, 2022

(30) Foreign Application Priority Data
Dec. 25, 2020 (JP) .............................. JP2020-216820

(51) Int. Cl.
*H02P 25/034* (2016.01)
*H02P 21/14* (2016.01)

(52) U.S. Cl.
CPC ............ *H02P 25/034* (2016.02); *H02P 21/14* (2013.01)

(58) Field of Classification Search
CPC ...... H02P 25/034; H02P 21/14; H02P 29/032; H02P 29/64
USPC .......... 318/135, 400.08, 400.04, 400.01, 700
See application file for complete search history.

(56) References Cited

U.S. PATENT DOCUMENTS

| 7,040,450 B2 * | 5/2006 | Nagase ................... H02P 21/04 180/443 |
|---|---|---|
| 2012/0229264 A1 | 9/2012 | Company Bosch et al. |
| 2013/0285579 A1 | 10/2013 | Kawabe et al. |
| 2017/0093318 A1 | 3/2017 | Ge et al. |
| 2020/0306796 A1 | 10/2020 | Lindemann et al. |

FOREIGN PATENT DOCUMENTS

JP  2012-176640  9/2012

OTHER PUBLICATIONS

Extended European Search Report dated May 19, 2022 in corresponding European Patent Application No. 21216637.5.

* cited by examiner

*Primary Examiner* — David Luo
(74) *Attorney, Agent, or Firm* — Crowell & Moring, L.L.P.

(57) ABSTRACT

One form of a motor control device includes: a waveform generation unit and an amplifier that generate a drive voltage of a voice coil motor (VCM); a DC offset detection unit that detects a DC offset of the drive voltage; a stop control unit that stops application of the drive voltage to a motor coil when the detected DC offset exceeds an operation stop threshold; a temperature correction value setting unit that sets a temperature correction value corresponding to the DC offset when the detected DC offset is lower than the operation stop threshold; a thermistor that detects an ambient temperature; and a vibration level control unit that varies the drive voltage and controls an amplitude level based on the detected ambient temperature and the set temperature correction value.

16 Claims, 4 Drawing Sheets

FIG. 3

| PATTERN | A | B | C | D |
|---|---|---|---|---|
| DC OFFSET (V) | 0 TO 0.5 | 0.5 TO 1.0 | 1.0 TO 1.5 | 1.5 TO 2.0 |
| TEMPERATURE CORRECTION VALUE X (°C) | 0 | +3 | +8 | +13 |

FIG. 4

| PATTERN | a | b | c | d | e |
|---|---|---|---|---|---|
| TEMPERATURE Z (°C) | LOWER THAN +3 | +3 TO +8 | +8 TO +13 | +13 TO +15 | +15 OR HIGHER |
| ATT AMOUNT | UNCONTROLLED | DECREASED BY 0.5 dB | DECREASED BY 1.5 dB | DECREASED BY 3 dB | — |
| DRIVING VOLTAGE | STANDARD | HIGH (SMALL) | HIGH (MODERATE) | HIGH (LARGE) | STOP |

MOTOR CONTROL DEVICE

RELATED APPLICATION

The present application claims priority to Japanese Patent Application Number 2020-216820, filed Dec. 25, 2020, the entirety of which is hereby incorporated by reference.

BACKGROUND

1. Field of the Disclosure

The present disclosure relates to a motor control device that controls driving of a voice coil motor.

2. Description of the Related Art

Conventional tactile feedback technology in which an operation site is vibrated using a voice coil motor (VCM) or the like is known (see, for example, JP 2012-176640 A). In general, the voice coil motor is used as a vibration source that generates vibration by applying a sinusoidal drive voltage with reversed phase across a coil. However, when a bias occurs in the drive voltage applied across the coil such that the center of amplitude does not become 0 V and a direct current (DC) offset occurs, a DC current flows through the coil due to the DC offset, and a temperature rises. When the temperature rise becomes excessive, a coating film of the coil melts, leading to smoking and burning.

SUMMARY OF THE DISCLOSURE

In light of the above, it is desirable to detect a DC offset exceeding a predetermined threshold and to perform a control to stop the application of a drive voltage.

In a case where a threshold serving as a reference for determining whether or not the application of a drive voltage is to be stopped is excessively low, slight noise during a normal operation may be detected, and the operation of the voice coil motor may be frequently stopped. On the other hand, in a case where the reference threshold is excessively high, a state in which a relatively high DC offset has occurred for a long time until the threshold is reached continues, and the temperature of the voice coil motor rises. In general, the voice coil motor has temperature dependency, and in order to obtain a certain amount of vibration, it is necessary to increase the drive voltage with the temperature rise. For this reason, even when smoking and burning of the coil can be avoided, a state in which the high temperature continues for a long time is not preferable.

The present disclosure has been made in view of such a point, and an objective of the present disclosure is to provide a motor control device capable of securing an appropriate vibration amount while preventing burning of a coil due to a DC offset of a drive voltage.

To address the above-described problems, a motor control device of the present disclosure is a motor control device that generates vibration in a motor by applying a drive voltage with reversed phase across a motor coil. One form of a motor control device includes: a drive voltage generation unit configured to generate the drive voltage; a DC offset detection unit configured to detect a DC offset of the drive voltage; a stop unit configured to stop the application of the drive voltage to the motor coil when the detected DC offset exceeds an operation stop threshold; a temperature correction value setting unit configured to set a temperature correction value corresponding to the DC offset when the detected DC offset is lower than the operation stop threshold; an ambient temperature detection unit configured to detect an ambient temperature; and a vibration level control unit configured to vary the drive voltage and to control an amplitude level based on the detected ambient temperature and the set temperature correction value.

The motor coil can be prevented from being damaged by stopping the operation when the DC offset becomes excessive. In addition, even in a case where the DC offset does not become excessive, by varying the drive voltage when the temperature rises with the occurrence of the DC offset and/or with the rise of the ambient temperature, it is possible to secure an appropriate vibration amount regardless of the temperature rise.

In some implementations, it is desirable that the drive voltage has a sinusoidal waveform with reversed phase.

In some implementations, it is desirable that the temperature correction value setting unit is configured to set the temperature correction value proportional to the DC offset. This makes it possible to set the temperature correction value corresponding to the temperature rise accompanying an increase in the DC offset.

The temperature correction value is a value assuming an amount of temperature rise of the motor coil due to the occurrence of the DC offset, and in some implementations, it is desirable that the vibration level control unit is configured to increase the drive voltage applied to the motor coil as a total temperature obtained by adding the temperature correction value to the ambient temperature increases. This makes it possible to obtain a certain vibration level regardless of the DC offset or the ambient temperature.

In some implementations, it is desirable that the ambient temperature detection unit is installed on the same substrate as that of the motor to detect the ambient temperature. In some implementations, it is desirable that the ambient temperature detection unit is installed in the same housing as that of the motor to detect the ambient temperature. This makes it possible to detect the ambient temperature that raises the temperature of the motor.

In some implementations, it is desirable that the motor is a voice coil motor. This makes it possible to ensure a constant amount of vibration of the voice coil motor while preventing the coil from being damaged due to a temperature rise.

BRIEF DESCRIPTION OF THE DRAWINGS

FIG. 3 is a diagram illustrating an example of a temperature correction value table; and FIG. 4 is a diagram illustrating an example of a vibration level table.

DETAILED DESCRIPTION OF THE DRAWINGS

One form of a motor control device according to the present disclosure will now be described with reference to the drawings.

Figure 1:
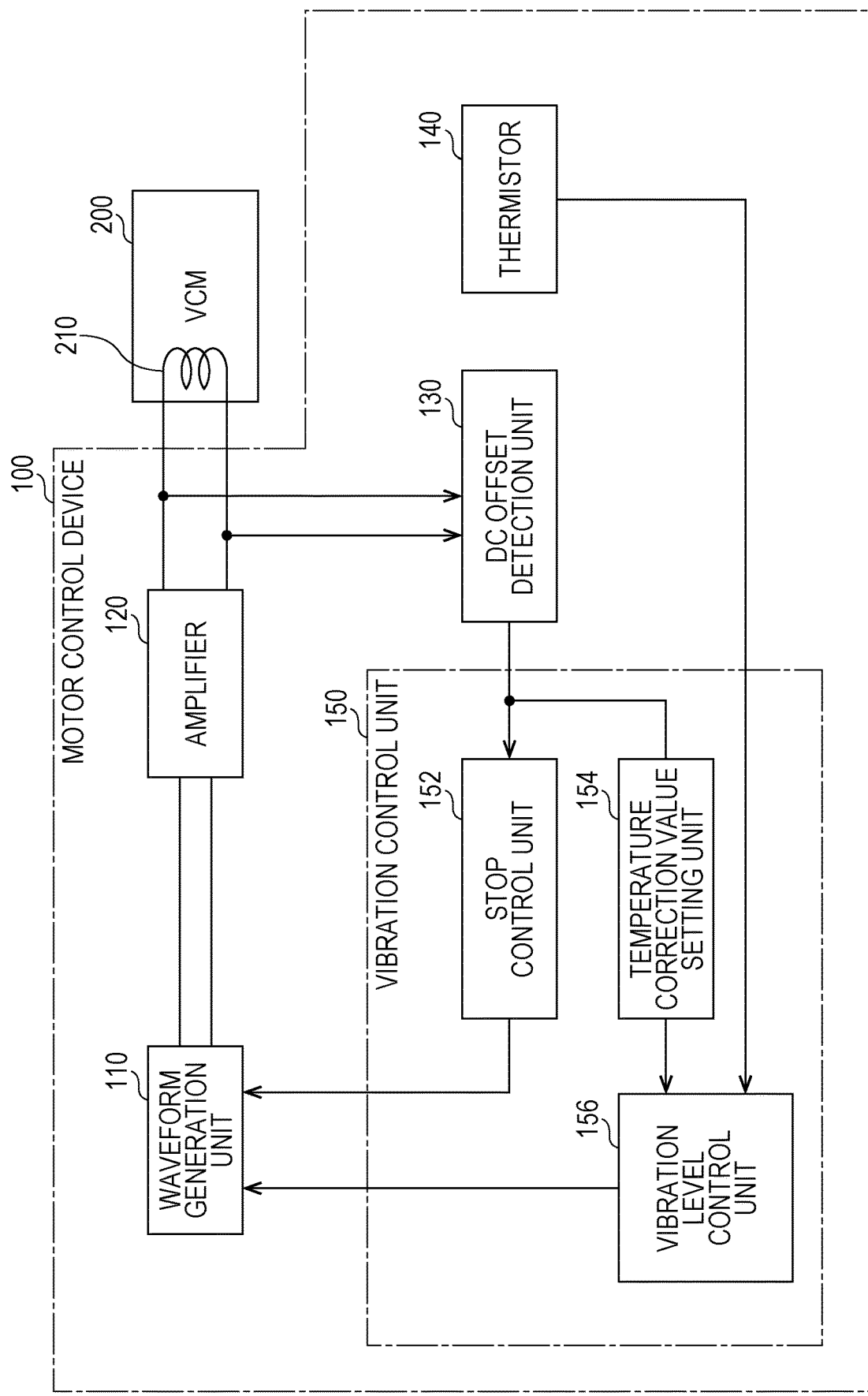
FIG. 1 is a diagram illustrating a configuration of one form of a motor control device.

FIG. 1 is a diagram illustrating a configuration of one form of a motor control device. As illustrated in FIG. 1, a motor control device 100 may include a waveform generation unit 110, an amplifier 120, a direct current (DC) offset detection unit 130, a thermistor 140, and a vibration control unit 150. In some implementations, elements such as the waveform generation unit 110, DC offset detection unit 130, or vibration control unit 150 may be implemented with circuitry, a controller, a hardwired processor, and/or a processor configured to executing instructions stored in a memory. The motor control device 100 applies a drive voltage with reversed phase across a motor coil 210 of a voice coil motor (VCM) 200 to generate vibration in the VCM 200. In addition, the VCM 200 to be controlled is provided in, for example, an operation device mounted on a vehicle, and is used to implement tactile feedback that generates vibration according to an operation of a user.

The waveform generation unit 110 generates two types of drive signals having a sinusoidal waveform with reversed phase. The amplifier 120 amplifies the two types of drive signals having a sinusoidal waveform to generate drive voltages, and applies each drive voltage across the motor coil 210 of the VCM 200.

The DC offset detection unit 130 detects the DC offset included in the drive voltage applied across the motor coil 210. Theoretically, in a case where the drive voltage having a sinusoidal waveform with reversed phase is applied across the motor coil 210, the center voltage is 0 V, and a DC offset that is a deviation from the center voltage does not occur (0 V). However, the DC offset may occur due to a deviation of an element constant of a component, an abnormality, or the like.

The thermistor 140 is a temperature detection element installed on the same substrate (or in the same housing) as that of the VCM 200, and detects the ambient temperature of the VCM 200. For example, the VCM 200 and the thermistor 140 may be mounted on a common substrate, or the VCM 200 and the thermistor 140 may be mounted in a common housing.

The vibration control unit 150 controls a vibration level of the VCM 200 based on the DC offset detected by the DC offset detection unit 130 and the ambient temperature detected using the thermistor 140. Therefore, the vibration control unit 150 includes a stop control unit 152, a temperature correction value setting unit 154, and a vibration level control unit 156.

The stop control unit 152 stops the application of the drive voltage to the motor coil 210 when the DC offset detected by the DC offset detection unit 130 exceeds an operation stop threshold (for example, 2 V). For example, an instruction may be issued to the waveform generation unit 110 to stop the operation of generating the drive signal. Alternatively, an instruction may be issued to the amplifier 120 to stop an operation of amplifying the drive signal.

In a case where the DC offset detected by the DC offset detection unit 130 is lower than the operation stop threshold, the temperature correction value setting unit 154 sets a temperature correction value corresponding to the DC offset. A specific example of the setting will be described later.

The vibration level control unit 156 transmits an instruction to the waveform generation unit 110 to vary a sinusoidal amplitude based on the ambient temperature detected using the thermistor 140 and the temperature correction value set by the temperature correction value setting unit 154, thereby varying the drive voltage applied from the amplifier 120 to the motor coil 210 to control the amplitude level of the VCM 200.

The waveform generation unit 110 and the amplifier 120 described above correspond to a drive voltage generation unit, the DC offset detection unit 130 corresponds to a DC offset detection unit, the stop control unit 152 corresponds to a stop unit, the temperature correction value setting unit 154 corresponds to a temperature correction value setting unit, the thermistor 140 corresponds to an ambient temperature detection unit, and the vibration level control unit 156 corresponds to a vibration level control unit.

One form of a motor control device 100 has the above-described configuration. Next, an operation thereof will be described.

Figure 2:
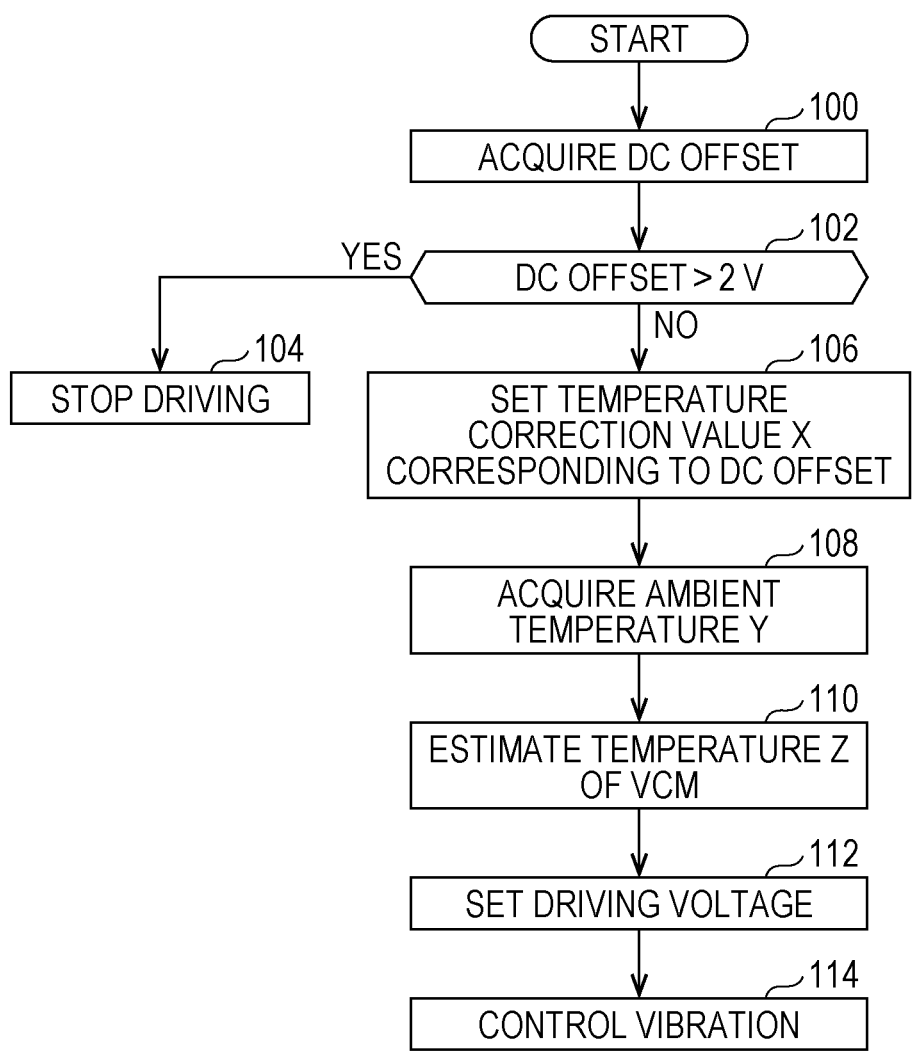
FIG. 2 is a flowchart illustrating one form of an operation procedure of a motor control device that is configured to control a vibration state of a voice coil motor (VCM) according to a direct current (DC) offset or an ambient temperature.

FIG. 2 is a flowchart illustrating one form of an operation procedure of a motor control device 100 that controls a vibration state of the VCM 200 according to the DC offset or the ambient temperature.

First, the stop control unit 152 and the temperature correction value setting unit 154 acquire the DC offset detected by the DC offset detection unit 130 based on the drive voltage having a sinusoidal waveform applied from the amplifier 120 to the motor coil 210 (Step 100). Next, the stop control unit 152 determines whether or not the DC offset exceeds 2 V as the operation stop threshold (Step 102). In a case where the voltage exceeds 2 V, the processing proceeds along "YES" branch, and the stop control unit 152 stops the application of the drive voltage to the motor coil 210 (Step 104).

On the other hand, in a case where the DC offset does not exceed 2 V, the processing proceeds along "NO" branch from Step 102. Next, the temperature correction value setting unit 154 sets the temperature correction value X corresponding to the DC offset based on a temperature correction value table (Step 106).

FIG. 3 is a diagram illustrating an example of the temperature correction value table. In the example illustrated in FIG. 3, a range in which the DC offset is equal to or less than the operation stop threshold is divided into the following four patterns A, B, C, and D.

Pattern A: The DC offset corresponds to a range of 0 V or more and 0.5 V or less. In a case where the DC offset falls within this range, the temperature correction value X is set to 0° C.

Pattern B: The DC offset corresponds to a range of more than 0.5 V and 1.0 V or less. In a case where the DC offset falls within this range, the temperature correction value X is set to +3° C.

Pattern C: The DC offset corresponds to a range of more than 1.0 V and 1.5 V or less. In a case where the DC offset falls within this range, the temperature correction value X is set to +8° C.

Pattern D: The DC offset corresponds to a range of more than 1.5 V and 2.0 V or less. In a case where the DC offset falls within this range, the temperature correction value X is set to +13° C.

Next, the vibration level control unit 156 acquires an ambient temperature Y detected by the thermistor 140 (Step 108). Next, the vibration level control unit 156 estimates a temperature (a temperature of the motor coil 210) Z of the VCM 200 based on the acquired ambient temperature Y and the temperature correction value X set by the temperature correction value setting unit 154, specifically, by adding the ambient temperature Y and the temperature correction value X (Step 110). In addition, the vibration level control unit 156 sets the drive voltage corresponding to the estimated temperature Z based on a vibration level table (Step 112).

FIG. 4 is a diagram illustrating an example of the vibration level table. In the example illustrated in FIG. 4, a range of the estimated temperature Z of the VCM 200 is divided into the following five patterns a, b, c, d, and e. Note that, in the presently described form, the sinusoidal amplitude is varied by performing predetermined attenuation processing on a sinusoidal waveform of a certain amplitude, and the amplitude of the sinusoidal waveform is consequently increased by decreasing an attenuation amount (ATT amount) in the attenuation processing. Therefore, as the "ATT amount" in FIG. 4 is changed in the order of "uncontrolled→decreased by 0.5 dB→decreased by 1.5 dB→decreased by 3 dB", the amount of attenuating the amplitude of the sinusoidal waveform is decreased, and as a result, the drive voltage is increased.

Pattern a: The estimated temperature Z corresponds to a range of lower than +3° C. In a case where the estimated temperature Z falls within this range, a default value of the attenuation amount (ATT amount) in the attenuation processing is used as it is (uncontrolled). The drive voltage at this time is a standard value.

Pattern b: The estimated temperature corresponds to a range of +3° C. or higher and lower than +8° C. In a case where the estimated temperature Z falls within this range, the attenuation amount (ATT amount) in the attenuation processing is set to be decreased by 0.5 dB. The drive voltage at this time is higher than the standard value, but a difference therebetween is small.

Pattern c: The estimated temperature corresponds to a range of +8° C. or higher and lower than +13° C. In a case where the estimated temperature Z falls within this range, the attenuation amount (ATT amount) in the attenuation processing is set to be decreased by 1.5 dB. The drive voltage at this time is higher than the standard value, but a difference therebetween is moderate.

Pattern d: The estimated temperature corresponds to a range of +13° C. or higher and lower than +15° C. In a case where the estimated temperature Z falls within this range, the attenuation amount (ATT amount) in the attenuation processing is set to be decreased by 3 dB. The drive voltage at this time is higher than the standard value, but a difference therebetween is large.

Pattern e: The estimated temperature corresponds to a range of +15° C. or higher. In a case where the estimated temperature Z falls within this range, since the temperature is excessively high, the application of the drive voltage is stopped.

When the drive voltage is determined in this way, the vibration level control unit 156 transmits an instruction to the waveform generation unit 110 to reflect the determination content, and performs a vibration control in which the drive voltage is varied (in the pattern e, the drive voltage is set to 0 V) (Step 114).

As described above, in the motor control device 100 of the presently described form, it is possible to prevent the motor coil 210 from being damaged by stopping the operation when the DC offset of the drive voltage applied to the motor coil 210 becomes excessive. In addition, even in a case where the DC offset does not become excessive, by varying the drive voltage when the temperature rises with the occurrence of the DC offset and/or with the rise of the ambient temperature, it is possible to secure an appropriate vibration amount regardless of the temperature rise.

In addition, the temperature correction value corresponding to a temperature rise accompanying an increase in the DC offset is set, and the total temperature obtained by adding the temperature correction value to the ambient temperature is increased, such that the drive voltage applied to the motor coil 210 is increased. This makes it possible to obtain a certain vibration level regardless of the DC offset or the ambient temperature.

In addition, in some implementations, the thermistor 140 is installed on the same substrate or in the same housing as that of the VCM 200, whereby the ambient temperature that raises the temperature of the VCM 200 can be detected.

Note that the present disclosure is not limited to the above-described form, and various kinds of modifications can be made within the scope of the present disclosure. For example, in the above-described form, the present disclosure is applied to the vibration control of the VCM 200 used in an operation device mounted on the vehicle, but the present disclosure can also be applied to a case where the vibration control is performed for the VCM used in the operation device that is not mounted on a vehicle or the VCM 200 that is not used in the operation device.

As described above, a motor coil can be prevented from being damaged by stopping the operation when the DC offset becomes excessive. In addition, even in a case where the DC offset does not become excessive, by varying the drive voltage when the temperature rises with the occurrence of the DC offset and/or with the rise of the ambient temperature, it is possible to secure an appropriate vibration amount regardless of the temperature rise.

While there has been illustrated and described what is at presently contemplated to be preferred forms and implementations of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments and forms disclosed, but that the disclosure will include all embodiments, forms, and implementations falling within the scope of the appended claims.

What is claimed is:

1. A motor control device configured to generate a vibration in a motor by applying a drive voltage with reversed phase across a motor coil, the motor control device comprising:
    a drive voltage generation unit configured to generate the drive voltage;
    a direct current (DC) offset detection unit configured to detect a DC offset of the drive voltage;
    a stop unit configured to stop the application of the drive voltage to the motor coil when the detected DC offset exceeds an operation stop threshold;
    a temperature correction value setting unit configured to set a temperature correction value corresponding to the DC offset when the detected DC offset is lower than the operation stop threshold;
    an ambient temperature detection unit configured to detect an ambient temperature; and
    a vibration level control unit configured to vary the drive voltage and to control an amplitude level based on the detected ambient temperature and the set temperature correction value.

2. The motor control device according to claim 1, wherein the drive voltage has a sinusoidal waveform with reversed phase.

3. The motor control device according to claim 2, wherein the temperature correction value setting unit is configured to set the temperature correction value proportional to the DC offset.

4. The motor control device according to claim 3, wherein:

the temperature correction value is a value assuming an amount of temperature rise of the motor coil due to occurrence of the DC offset, and the vibration level control unit is configured to increase the drive voltage applied to the motor coil as a total temperature obtained by adding the temperature correction value to the ambient temperature increases.

5. The motor control device according to claim 4, wherein the ambient temperature detection unit is installed on the same substrate as that of the motor to detect the ambient temperature.

6. The motor control device according to claim 5, wherein the ambient temperature detection unit is installed in the same housing as that of the motor to detect the ambient temperature.

7. The motor control device according to claim 6, wherein the motor is a voice coil motor.

8. The motor control device according to claim 1, wherein the temperature correction value setting unit is configured to set the temperature correction value proportional to the DC offset.

9. The motor control device according to claim 8, wherein:

the temperature correction value is a value assuming an amount of temperature rise of the motor coil due to occurrence of the DC offset, and the vibration level control unit is configured to increase the drive voltage applied to the motor coil as a total temperature obtained by adding the temperature correction value to the ambient temperature increases.

10. The motor control device according to claim 9, wherein the ambient temperature detection unit is installed on the same substrate as that of the motor to detect the ambient temperature.

11. The motor control device according to claim 10, wherein the ambient temperature detection unit is installed in the same housing as that of the motor to detect the ambient temperature.

12. The motor control device according to claim 11, wherein the motor is a voice coil motor.

13. The motor control device according to claim 1, wherein:

the temperature correction value is a value assuming an amount of temperature rise of the motor coil due to occurrence of the DC offset, and the vibration level control unit is configured to increase the drive voltage applied to the motor coil as a total temperature obtained by adding the temperature correction value to the ambient temperature is increased.

14. The motor control device according to claim 13, wherein the ambient temperature detection unit is installed on the same substrate as that of the motor to detect the ambient temperature.

15. The motor control device according to claim 14, wherein the ambient temperature detection unit is installed in the same housing as that of the motor to detect the ambient temperature.

16. The motor control device according to claim 15, wherein the motor is a voice coil motor.

* * * * *